United States Patent [19]

Richards

[11] E Patent Number: Re. 32,591

[45] Reissued Date of Patent: Feb. 9, 1988

[54] AUTOMATIC MECHANICAL TRANSMISSION SYSTEM

[75] Inventor: Elmer A. Richards, Kalamazoo, Mich.

[73] Assignee: Eaton Corporation, Cleveland, Ohio

[21] Appl. No.: 864,388

[22] Filed: May 19, 1986

Related U.S. Patent Documents

Reissue of:

[64] Patent No.: 4,527,447
Issued: Jul. 9, 1985
Appl. No.: 446,918
Filed: Dec. 6, 1982

[51] Int. Cl.[4] ..... F16H 3/08; F16H 3/38; F16H 5/50; B60K 41/04

[52] U.S. Cl. ..... 74/866; 74/331; 74/336 R; 74/339; 74/745

[58] Field of Search ..... 74/866, 331, 336 R, 74/745, 339, 335, 740; 192/53 F

[56] References Cited

U.S. PATENT DOCUMENTS

| | | | |
|---|---|---|---|
| 2,923,175 | 2/1960 | Perkins | 74/740 |
| 2,932,988 | 4/1960 | Flynn et al. | 74/745 |
| 3,105,395 | 10/1963 | Perkins | 74/745 |
| 3,229,551 | 1/1966 | Stuckey | 74/745 |
| 3,237,472 | 3/1966 | Perkins et al. | 74/331 |
| 3,265,173 | 8/1966 | Russell | 74/695 |
| 3,283,613 | 11/1966 | Perkins | 74/396 |
| 3,335,616 | 8/1967 | Perkins | 74/331 |
| 3,478,851 | 11/1969 | Smyth et al. | 74/339 |
| 3,648,546 | 3/1974 | McNamara et al. | 74/331 |
| 3,776,048 | 12/1973 | Enomoto et al. | 74/866 |
| 3,799,002 | 3/1974 | Richards | 74/745 |
| 3,921,469 | 11/1975 | Richards | 192/53 F |
| 3,924,484 | 12/1975 | Richards | 74/339 |
| 3,983,979 | 10/1976 | Richards | 74/339 |
| 4,038,889 | 8/1977 | Lindow et al. | 74/866 |
| 4,132,122 | 1/1979 | Richards | 74/339 |
| 4,176,736 | 12/1979 | Richards et al. | 192/53 F |
| 4,192,196 | 3/1980 | Bogema et al. | 192/53 F |
| 4,194,410 | 3/1980 | Richards | 74/339 |
| 4,216,295 | 10/1980 | Rembold et al. | 74/866 |
| 4,361,060 | 11/1982 | Smyth | 74/752 A |
| 4,440,037 | 4/1984 | Foxton et al. | 74/331 |

FOREIGN PATENT DOCUMENTS

| | | | |
|---|---|---|---|
| 2012892 | 8/1979 | United Kingdom | 74/866 |

*Primary Examiner*—Leslie Braun
*Assistant Examiner*—David Novais
*Attorney, Agent, or Firm*—D. A. Rowe; H. D. Gordon

[57] ABSTRACT

An automatic mechanical change gear transmission system (10) is provided. The transmission (12) is a splitter type comprising a main section (48) connected in series with a blocked splitter type auxiliary section (50). The auxiliary section blockers (172) and clutch members (164) are provided with ramps (218, 220, 222, 224) which will tend to align the blockers and ramps in a nonblocking condition under the influence of biasing spring (178) if the main section is in neutral. A control unit (38) receives input signals and commands transmission shifts in a sequence including shifting the main section into neutral and shifting the auxiliary section to a new ratio during each shift procedure.

20 Claims, 10 Drawing Figures

| SPEED | TRANSMISSION RATIO | ENGAGED MAIN SECTION RATIO GEAR | ENGAGED AUX. SECTION RATIO GEAR |
|---|---|---|---|
| 1 | 17.52 | 82 | 152 |
| 2 | 13.41 | 82 | 154 |
| 3 | 10.36 | 82 | 156 |
| 4 | 8.00 | 82 | 158 |
| 5 | 6.21 | 80 | 152 |
| 6 | 4.75 | 80 | 154 |
| 7 | 3.67 | 80 | 156 |
| 8 | 2.83 | 80 | 158 |
| 9 | 2.19 | 58 | 152 |
| 10 | 1.68 | 58 | 154 |
| 11 | 1.30 | 58 | 156 |
| 12 | 1.00 | 58 | 158 |
| R1 | 16.06 | 84 | 158 |
| R2 | 12.29 | 84 | 154 |
| R3 | 9.50 | 84 | 156 |
| R4 | 7.33 | 84 | 158 |

AUTOMATIC MECHANICAL TRANSMISSION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to automatic mechanical transmission systems and in particular to automatic mechanical transmission systems comprising a compound change gear transmission of the type comprising a multi-speed main transmission section connected in series with a multi-speed splitter type auxiliary transmission section wherein the main transmission section utilizes nonsynchronized, unblocked resiliently shifted jaw clutch assemblies to selectively engage a selected main section ratio and wherein the auxiliary section utilizes blocked resiliently shifted jaw clutch assemblies to selectively engage a selected auxiliary section ratio and a control system thereof. Preferably, the blockers and associated clutch members in the auxiliary transmission section have complementary ramps on the blocking members thereof configured to prevent nonsynchronized engagement of the associated jaw clutch members when the main section is engaged but which will tend to act as positioners to place the associated blocker and clutch member in a nonblocking condition when the main section is in a neutral or disengaged condition. Preferably, the transmission is driven by a throttle control engine and the control system includes a central processing unit for receiving input signals indicative of at least engine speed and throttle position, for selecting a desired gear ratio in accordance with a predetermined program acted upon by current and/or stored input information and for generating command signals to a transmission operating mechanism.

2. Related Application

This application is related to my copending U.S. patent application Ser. No. 287,470, filed July 27, 1981, and titled Semi-Blocked Transmission.

3. Description of the Prior Art

Compound transmissions of the splitter or range type or a combination thereof, are well known in the prior art as may be seen by reference to U.S. Pat. Nos. 3,105,395; 3,648,546; 3,799,002; 2,932,988 and 3,229,551, all hereby incorparated by reference.

Blocked change gear transmissions of both the single and compound types are also well known in the prior art as may be seen by reference to U.S. Pat. Nos. 3,799,002; 3,921,469; 3,924,484; 3,983,979; 4,192,196 and 4,194,410, all of which are hereby incorporated by reference.

Control systems for automatic mechanical transmissions are known in the prior art as may be seen by reference to Published British Patent Application No. 2,012,892 which corresponds to allowed U.S. patent application Ser. No. 190,512 filed Jan. 24,1978 now U.S. Pat. No. 4,361,060, hereby incorporated by reference.

In the design of transmissions, particularly heavy duty constant mesh mechanical transmissions, such as used in heavy duty trucks, there has existed for a long time the problem of shifting the transmission to the various speed ratios, which problem is even greater when the transmission is compounded, that is provided with an auxiliary transmission section of the range or splitter type for increasing the number of speed ratios. Most previously known compound mechanical transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which is desirable to ease, or avoid entirely, if possible. Compound transmissions utilizing resiliently shifted blocked jaw clutch mechanisms are known in the prior art and have provided a transmission shifting mechanism which eliminates the necessity of synchronizer clutches while providing a transmission which is relatively easier to shift than the nonblocked, nonsynchronized mechanical transmissions of the prior art. Automatic control systems for mechanical transmissions which include a central processing unit having a predetermined program or set of logic rules for acting upon certain input signals, such as at least inputs indicative of engine speed and throttle position, to select a desired gear ratio and to generate command output signals to the transmission to command an upshift to a higher gear ratio or a downshift to a lower gear ratio if required are known in the prior art. While such automatic mechanical transmission systems provide a highly desirable and highly efficient automatic transmission, the prior art automatic mechanical transmission systems have not been utilized in connection with automatic mechanical transmissions of the blocked or semi-blocked type and thus have not been operable to command a desired gear ratio change in a sequence taking full advantage of the operational advantages of a blocked or semi-blocked transmission.

SUMMARY OF THE INVENTION

In accordance with the present invention, the drawbacks of the prior art have been overcome or minimized by the provision of an automatic mechanical transmission system comprising a compound splitter type constant mesh change gear transmission comprising a main transmission section and an auxiliary splitter transmission section connected in series thereto wherein the auxiliary transmission section utilizes resiliently shiftable blocked jaw clutch assemblies, the main transmission section preferably utilizes nonblocked nonsynchronized resilient jaw clutch assemblies, and a central processing unit for receiving certain inputs and for commanding gear changes in the sequence comprising shifting the main transmission section to neutral, then commanding a shift in the auxiliary transmission section to engage the desired auxiliary transmission gear ratio and thereafter commanding a shift in the main transmission section to engage the desired main transmission ratio. The central processing unit thus commands transmission shifts in a sequence which will provide rapid and sure transmission shifts and which utilizes the features of a blocked or semi-blocked transmission to avoid the synchronizing means and/or procedures necessary in previous automatic mechanical change gear transmission systems.

The above is accomplished by providing a compound transmission, preferably of the splitter type, wherein the main transmission section is preferably provided with nonsynchronized nonblocked resilient jaw clutch means, the auxiliary transmission section is provided with resiliently shiftable blocked jaw clutch assemblies and the blocked jaw clutch assemblies are provided with complementary ramp members on the associated blocker and clutch members which will cause the blockers to prevent nonsynchronous engagement of the associated jaw clutch assemblies when the main transmission section is engaged but which will cause the blocker to tend to rotationally move to a nonblocking position under the influence of a spring bias when the main transmission section is in neutral. The above structure provides a relatively uncomplicated and reliable compound transmission which is shiftable with substantially the ease of a simple transmission and allow shifts to be completed with the vehicle in a static condition.

Accordingly, it is an object of the present invention to provide a new and improved automatic mechanical transmission system of the type comprising a semi-blocked compound change gear transmission and an improved central processing unit for commanding transmission gear changes in a sequence utilizing the advantageous transmission operating characteristics to their full advantage.

Another object of the present invention is to provide an automatic mechanical transmission system utilizing a semi-block compound splitter type mechanical transmission.

These and other objects and advantages of the present invention will become apparent from a reading of the detail description of the preferred embodiment taken in view of the accompanying drawings.

DESCRIPTION OF THE PREFERRED EMBODIMENT

Referring now to the aparatus in detail. It will be recognized that a detailed disclosure of both the construction and operation of blockers and blocked transmissions utilizing same has been set forth and claimed in the above mentioned patents and reference is made thereto for such details. It will also be recognized that a detailed disclosure of a control system for an automatic mechanical transmission has been set forth in Published British Patent Application No. 2,012,892 and corresponding allowed U.S. patent application Ser. No. 190,512 filed Jan. 24,1978, now U.S. Pat. No. 4,361,060 and reference is made thereto for such details.

Figure 1:
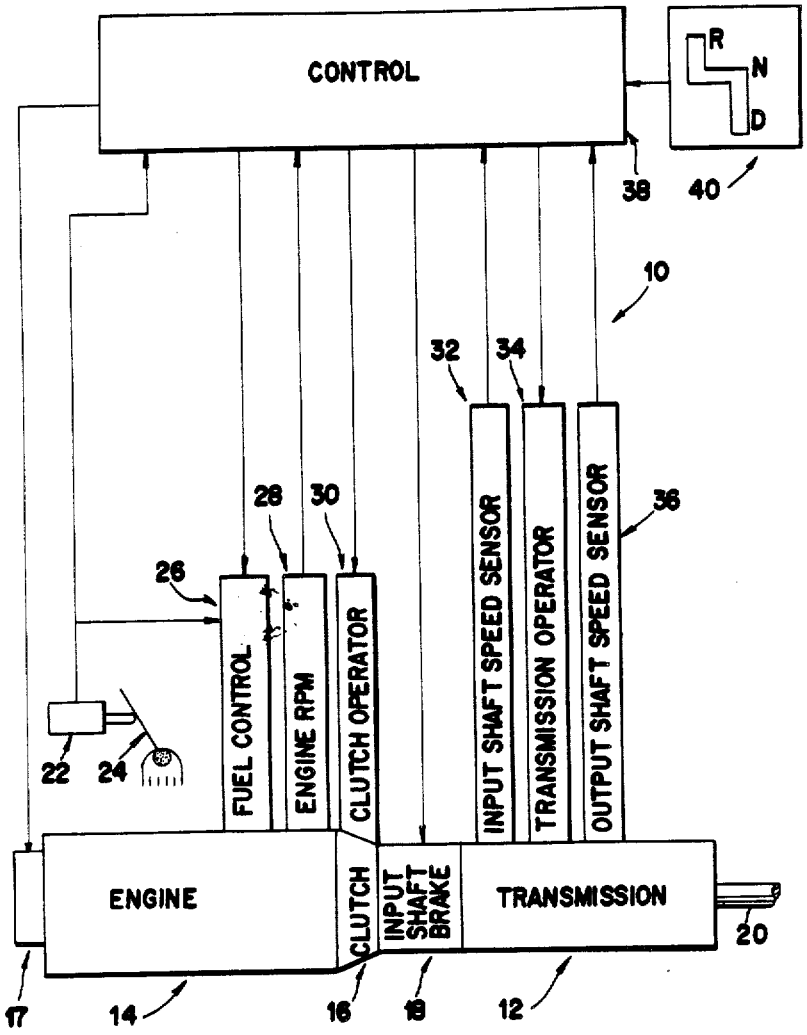
FIG. 1 is a schematic illustration of the automatic mechanical transmission system of the present invention.

Certain terminology will be used in the following description for convenience only and will not be limiting. The words "upwardly", "downwardly", "rightwardly" and "leftwardly" will designate directions in the drawings to which reference is made. The words and "forward" and "rearward" will refer respectively to the front and rear ends of the transmission as seen is conventionally mounted in the vehicle, being respectively the left and right sides of the transmission as illustrated in FIG. 1. The words "inwardly" and "outwardly" will refer to directions towards and away from, respectively, the geometric center of the device and designated parts thereof. Said terminology will include the words above specifically mentioned, derivatives thereof and words of similar import.

The term "simple transmission" is used to designate a change speed transmission wherein the operator may select one of a plurality of single gear reductions. The term "compound transmission" is used to designate a transmission having a main transmission portion and an auxiliary transmission portion connected in series whereby the selected geasr reduction in the main transmission portion may be compounded by further selected gear reduction in the auxiliary transmission portion. The term "splitter type compound transmission" as used herein will designate a compound transmission wherein the auxiliary transmission is used to provide various selectable steps or subdivisions of the gear ratio selected in the main transmission portion. In a splitter type compound transmission, the main transmission section is typically provided with relatively wide steps which are split or subdivided by the auxiliary transmission section. The term "upshift" as used herein shall mean the shifting from a lower speed gear ratio to a higher speed gear ratio. The term "downshift" as used herein shall mean the shifting from a higher speed gear ratio to a lower speed gear ratio. The term "low speed gear", "low gear" and/or "first gear" as used herein shall all designate the gear ratio utilized for lowest forward speed operation in a transmission, i.e., that set of gears having the highest ratio of reduction relative to the input shaft of the transmission.

The term "blocked transmission" or "blocked transmission section" shall designate a change gear transmission or transmission section wherein a selected gear is nonrotatably coupled to a shaft by means of a positive clutch and a blocker is utilized to prevent such engagement until the members of the positive clutch are at substantially synchronous speed, such synchronous condition achieved by manipulation of the transmission input and/or output shafts to cause a crossing of synchronous condition therebetween but not achieved by frictional contact of the selected clutch members sufficiently to cause one of the clutch members, and the apparatus associated therewith, to rotate with the other clutch member.

The term "synchronized transmission" shall designate a change gear transmission wherein a selected gear is nonrotatably coupled to a shaft by means of a positive clutch, attempted engagement of such clutch is prevented until the members of the clutch are at synchronous and frictional means associated with the clutch members are sufficient, upon initiation of a clutch engagement, to cause the clutch members, and all members rotating therewith, to rotate at a substantially synchronous speed of rotation.

Insofar as concerns the integration of the relatively nondeformable blockers into the shiftable change speed auxiliary transmission splitter section of the present invention, the blockers are placed between the two relatively axially slidable portions, or members, of at least one and preferably most or all of the auxiliary transmission section positive clutches and the usual friction means are provided for causing the blockers to tend to rotate with one of the members as the clutch members respectively move toward each other during a clutching procedure. One of such clutch members is often formed integrally with a mainshaft gear as internal or external clutch teeth thereof, as the clutching procedure occurs, the block limits such relative axial movement until substantial synchronization between the clutch members involved in a given shift is sensed.

The auxiliary section blockers of the present invention, and the other clutch elements of a given clutchable pair of clutch members, are typically provided with complementary angling leading spaces or ramps on the blocker teeth or members thereof to tend to, under the influence of the spring bias, cause a synchronizing and then an unblocking when the mainshaft is otherwise unconnected to any other mainshaft gears and hence at a minimum inertia. The angling of the blocker teeth is, however, insufficient to affect unblocking when the mainshaft is clutched to another mainshaft gear, i.e., when the main transmission section is not in neutral. It has been found that complementary ramp angles of about 15° to 25°, preferably about 20°, provides satisfactory operation when used in connection with normally encountered spring forces and clutch inertias. As may be seen by reference to U.S. Pat. Nos. 3,921,469 and 3,924,484, both above mentioned, there may further be provided means by which a significant axial drag with a minimum of rotational drag is provided constantly between the blocker ring and the clutch member blocked thereby. Thus, said blocker rings will be axially urged upon axial movement of said last name clutch element into engagement with the driving cone of the other clutch element and will thereby be held in proper position against the affect of its own inertia with respect to the gear associated therewith. This assures that, in most operating situations, the blocker rings will be in the desired position prior to contact with the blocking surfaces of the clutch.

The illustrated blocker elements also contain advantageous features in that there is required removal of only one portion of one tooth of a clutch member and the blocker ring is provided with a pair of teeth or projections extending toward the clutch element from which a part of said one tooth has been removed. Said teeth are of sufficient circumferential spacing to straddle the remaining portion of said one tooth when synchronization is achieved for effecting an unblocking condition but at least one of said blocker teeth are themselves of circumferential dimension less than the spacing between the teeth on said clutch element for permitting circumferential shifting thereof in at least one direction and the creation of a blocking condition.

FIG. 1 schematically illustrates an automatic mechanical transmission system 10 including an automatic multi-speed compound splitter type change gear transmission 12 driven by a throttle controlled engine 14, such as a well known diesel engine, through a master clutch 16. As engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmission 12 is output shaft 20 which is adopted for driving connection to an appropriate vehicle component such as the differential of a drive axle, a transfer case or the like as is well known in the prior art. The above mentioned power train components are acted upon and monitored by several devices each of which will be discussed in greater detail below. These devices include a throttle position or throttle opening monitor assembly 22 which senses the position of the operator controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16, a transmission input shaft speed sensor 32, a transmission operator 34 which is effective to shift the transmission 12 into a selected gear ratio, and a transmission output shaft speed sensor 36.

The above mentioned devices supply information to or accept commands from a central processing unit or control 38. The central processing unit 38 may include analogue and/or digital electronic calculation and logic circuitry, the specific configuration and structure of which forms no part of the present invention. The central processing unit 38 also receives information from a shift control assembly 40 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. Drive train components and controls therefor of the type described above are known in the prior art and may be appreciated in greater detail by reference to above mentioned allowed copending U.S. patent application Ser. No. 190,512 filed Jan. 24, 1978, now U.S. Pat. No. 4,361,060 and/or U.S. Pat. Nos. 3,776,048; 4,038,889 and 4,226,295, all of which are hereby incorporated by reference.

Sensors 22, 28, 32, 36 and 40 may be of any known type or construction for generating analogue or digital signals proportional to the parameter monitored thereby. Similarly, operators 17, 18, 26, 30 and 34 may be of any known electrical, pneumatic or electropneumatic type for executing operations in response to command signals from processing unit 38. Fuel control 26 will normally supply fuel to engine 14 in accordance with the operator's setting of throttle 34 but may supply a lesser (fuel dip) or greater (fuel boast) amount of fuel in accordace with commands from control unit 38.

Figures 8, 9:
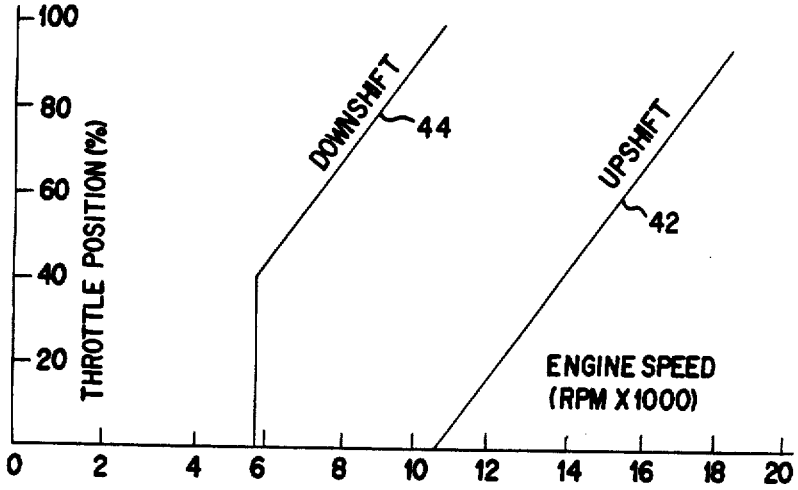
FIG. 8 is a graph of shift point profiles generated by the control unit of the automatic mechanical transmission system of the present invention.
FIG. 9 is a chart illustrating the engaged gears and the ratio of output shaft speed to input shaft speed for each ratio of the transmission of FIGS. 2, 3A, and 3B.

The purpose of the central processing unit 38 is to select, in accordance with a program and current or stored parameters, the optimal gear ratio at which the transmission should be operating and, if necessary, to command a gear change, or shift, into the selected optimal gear ratio based upon the current and/or stored information. The primary purposes of the central processing unit program or logic rules is to generate a shift pattern, or shift point profile, as seen in FIG. 8. The shift point profile generated by the central processing unit will determine if the transmission should remain in the currently engaged gear ratio, should be upshifted to the next highest gear ratio or should be downshifted to the next lower gear ratio. The shift point profiles graphically illustrated in FIG. 8 are a function of both throttle position, expressed as a percentage of maximum throttling position, and engine speed. Of course, other monitored speeds such as vehicle speed, input shaft speed, etc., may be substituted for engine speed as is known in the prior art. The shift point profile includes an upshift line 42 and a downshift line 44. Briefly, for operating conditions at or to the right of upshift line 42 the transmission should be upshifted to the next highest gear ratio, for operating conditions at or to the left of downshift line 44 the transmission should be downshifted to the next lower gear ratio and for operating conditions in the space bounded by upshift line 42 and downshift line 44 no gear change is required.

Figure 2:
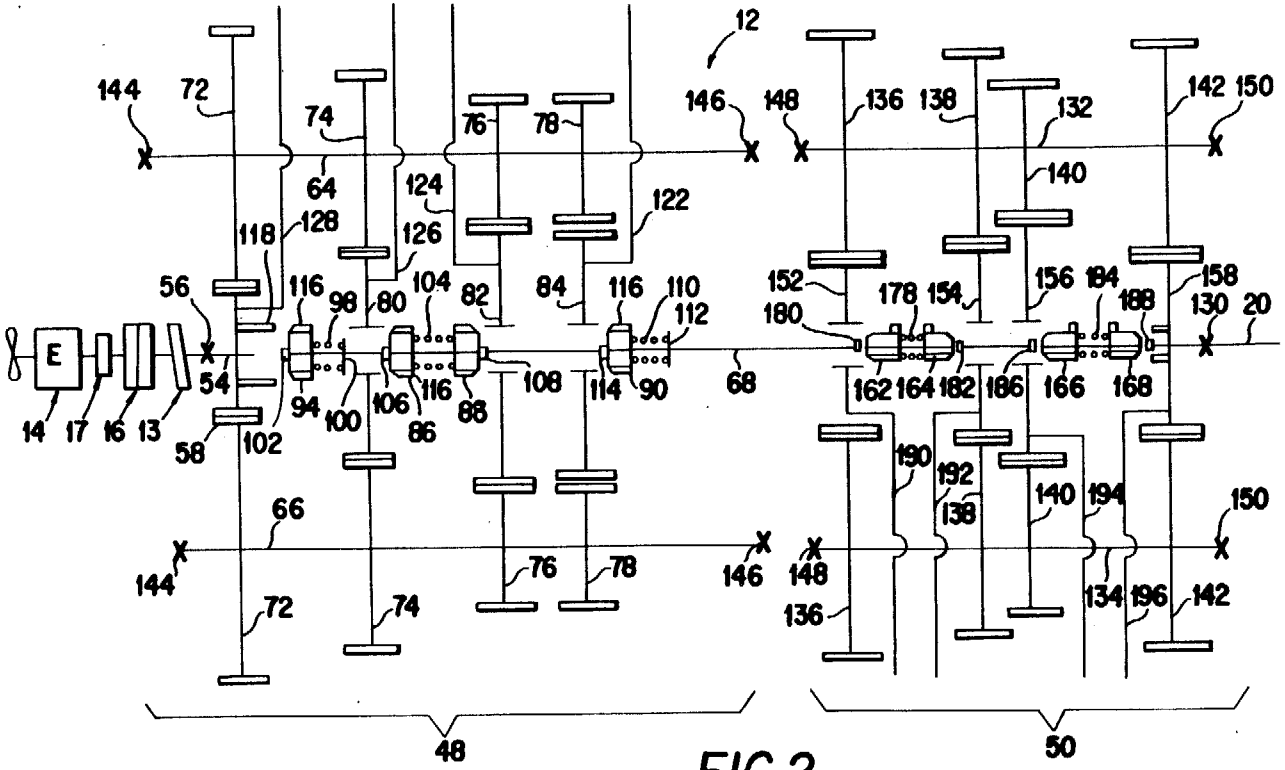
FIG. 2 is a schematic illustration of a 12 speed version of a semi-blocked compound splitter type transmission utilized in the automatic mechanical transmission system of the present invention.
Figure 3A:
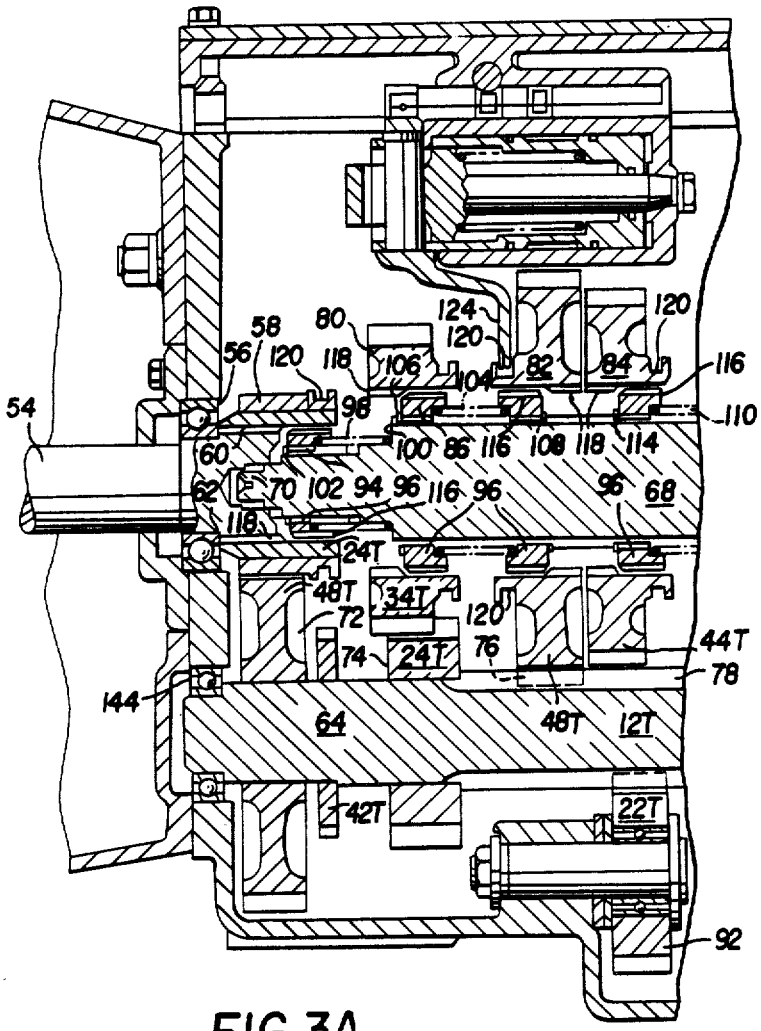
FIGS. 3A and 3B are collectively a partial sectional view of the transmission schematically illustrated in FIG. 2.
Figure 3B:
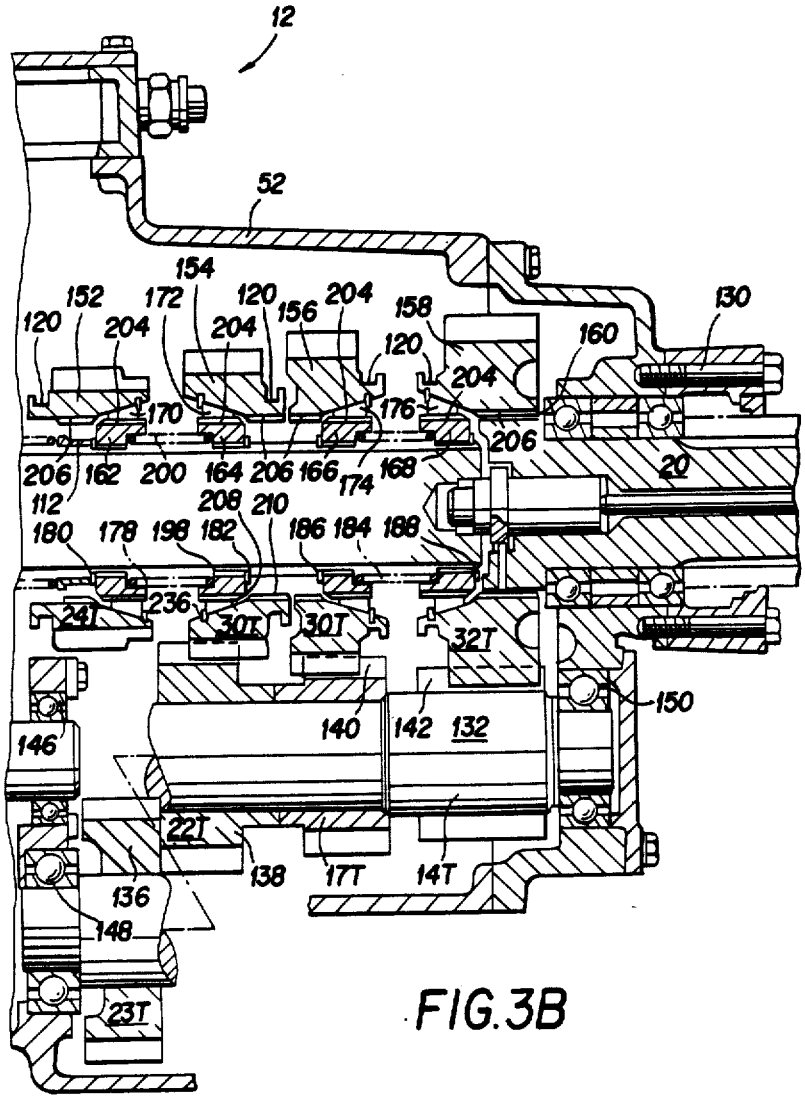
Figure 4:
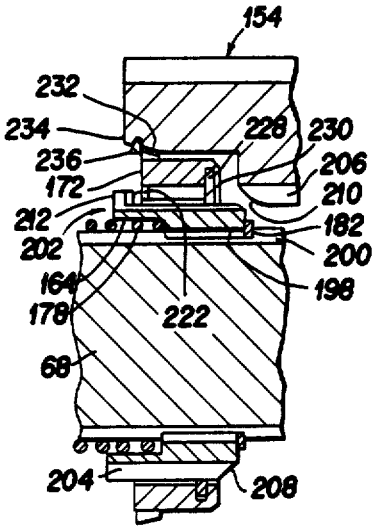
FIG.4 PRIOR ART
FIG. 4 is an enlarged fragmentary view, in section, of one of the prior art jaw clutch-blocker assemblies utilized in the auxiliary splitter section of the transmission of FIGS. 2, 3A, and 3B.

Referring now to FIGS. 2, 3A, and 3B, there is illustrated a "3×4", twelve forward speed, semi-blocked, splitter type, compound transmission 12. Transmission 12 comprises a main section 48 connected in series with an auxiliary section 50, each of which have a plurality of selectable ratio speeds, or power paths. The main and auxiliary sections are both suitable enclosed by a conventional housing means 52.

The transmission 12 includes an input shaft 54 supported adjacent its rightward end by a bearing 56 and is provided with an input gear 58 nonrotatably but slidably connected thereby as by splines 60 and 62. The input gear 58 simultaneously drives a plurality of main section countershafts at equal speeds. In the illustrated embodiment, the transmission is provided with two main section countershafts 64 and 66, disposed on diametrically opposite sides of the mainshaft 68, which mainshaft is coaxially aligned with the input shaft 54 and is provided with a pilot portion 70 on its forward end rotatably received within and supported by the rearward end of input shaft 54.

The input shaft 54 is normally driven in one direction only by a prime mover, such as a throttle controlled diesel engine 14 through a selectively engaged and disengaged master friction clutch 16 as is known in the prior art. Master clutch 16 may have a clutch brake or input shaft brake 18 associated therewith.

Each of the main section countershafts 64 and 66 is provided with an identical grouping of countershaft gears 72, 74, 76 and 78 thereon, which groupings form pairs of gears, such as the pair of gears 72, of identical size and number of teeth and disposed on diametrically opposite sides of the mainshaft 68. As may be seen by reference to FIGS. 3A and 3B, countershaft gears 76 and 78 may be defined by involute splines formed directly on the main section countershafts 64 and 66.

A plurality of main section main shaft drive gears 80, 82 and 84 surround the mainshaft 68 and are selectively clutchable thereto, one at a time, by resiliently slidable, nonblocked, nonsynchronized positive jaw clutch collars 86, 88 and 90, respectively.

The main section mainshaft gears 80 and 82 encircle the mainshaft 68 and are in continuous meshing engagement with, and are floatingly supported by the diametrically opposite pairs of counter shaft gears 74 and 76, respectively, which mounting means and the special advantages resulting therefrom are explained in greater detail in U.S. Pat. Nos. 3,105,395 and 3,335,616, both assigned to the assignee of this application and hereby incorporated by reference. The mainshaft gear 84 is the reverse gear and is in continuous meshing engagement with a pair of countershaft gears 78 by means of conventional intermediate idler gears 92. The forward most countershaft gears 72 are continuously meshed and driven by input gear 58 for causing simultaneous rotation of countershafts 64 and 66 whenever the input shaft is rotatably driven. Main section mainshaft gears 80, 82 and 84 and main section countershaft gears 72, 74, 76 and 78 and the idler gears 92 are all constantly meshed with and driven by the input gear 58 and thus, in combination, form the input gearing of the transmission 12.

An additional resiliently biased axially slidable nonsynchronized nonblocked positive clutch collar 94 is provided for rotatably coupling input gear 58 and input shaft 54 directly to mainshaft 68.

As may be seen in greater detail by reference to U.S. Pat. No. 3,799,002, each of the clutch collars 86, 88, 90 and 94 are splined to mainshaft 68 by means of internal splines 96 for rotation therewith and axial movement relative thereto and are biased toward its respective gear 80, 82, 84 and 58, respectively by a spring biasing means. Biasing spring 98 engages a shoulder 100 provided on mainshaft 68 and biases clutch collar 94 leftwardly into engagement with positive stop 102. Biasing spring 104 is received between clutch collar 86 and 88 and biases clutch collar 86 leftwradly into contact with positive stop 106 and clutch collar 88 rightwardly into positive contact with stop member 108. Biasing spring 110 is seated on a spring stop member 112 and biases clutch 90 leftwardly into contact with positive stop member 114. In the neutral position of the main transmission section as seen in FIGS. 2, 3A, and 3B, the positive stops will retain the sliding clutch collars out of engagement with the gears associated therewith. Each of the clutch collars 86, 88, 90 an 94 is provided with external clutch teeth 116 which are interengageable with internal clutch teeth 118 provided on gears 80, 82, 84 and 58. Preferably, the leading of edges of clutch teeth 116 and 118 are tapered at a complementary angle of preferably between 30° and 40° relative to the longitudinal axis of mainshaft 68. The exact degree of taper, and the advantages thereof, are explained in detail in U.S. Pat. No. 3,265,173, hereby incorporated by reference.

Mainshaft gears 80, 82 and 84 and input gear 54 are provided with grooves 120 in which are received shift forks 122, 124, 126 and 128, respectively. For imparting an axial movement relative to the mainshaft 68 thereto. Shift forks 122, 124, 126 and 128 are controlled by shifting mechanism, such as shift cylinders, to be discussed in greater detail below. By way of example, to engage mainshaft gear 80 to mainshaft 68, mainshaft gear 80 is moved axially rightwardly from the position shown to engage internal clutch teeth 118 of mainshaft gear 80 with external clutch teeth 116 carried by sliding clutch collar 86. Upon contact of the positive clutch teeth, the sliding clutch collar 86 will move rightwardly against the bias of spring 104 and will be spring biased to move rapidly leftwardly into engagement with the clutch teeth 116 carried by gear 80 at the occurrence of substantially synchronous rotation therewith.

Considering now the splitter auxiliary section 50, the mainshaft 68 extends thereinto and is coaxially arranged with and piloted onto an output shaft 2 which is in turn supported within the housing 52 by suitable bearings generally indicated at 130. Said auxiliary section further includes a plurality of auxiliary section countershafts 132 and 134 each having an identical grouping of auxiliary section countershaft gears 136, 138, 140 and 142 theron.

As is known in the art, and as is illustrated in abovementioned U.S. Pat. No. 3,105,395, to minimize the axial and transverse dimensions of the twin countershaft type compound transmission, the mainshaft section countershafts 64 and 66 are displaced about 90° from the auxiliary section countershafts. Main section countershafts 64 and 66 are supported in housing 52 by bearings 144 and 146 while auxiliary section countershafts 132 and 134 are supported in housing 54 by bearings 148 and 150.

Three auxiliary section mainshaft gears 152, 154 and 156 encircle the mainshaft 68 and are constantly meshed with and floatingly supported by the auxiliary countershaft gear pairs 136, 138 and 140, respectively. Output gear 158 is splined to output shaft 20 as at splines 160 for axial movement relative thereto and rotational movement therewith. Output gear 158 is constantly meshed with auxiliary countershaft gear pair 142.

Resiliently biased clutch members 162, 164, 166 and 168 are splined to mainshaft 68 and, in combination with blockers (shown in FIGS. 3A and 3B only) 170, 172, 174 and 176, respectively, provide resilient, blocked clutching apparatus of the type described in U.S. Pat. Nos. 3,799,002, 3,921,469 and 3,924,484 for selectively clutching gears 152, 154, 156 and 158, respectively, one at a time, to mainshaft 68. Clutches 162 and 164 are biased axially by spring 178 limited in their axial movements by positive stops 180 and 182. Clutch members 166 and 168 are biased axially apart by spring 184 and limited in axial movement by stops 186 and 188.

Gears 152, 154, 156 and 158, respectively, are each provided with a generally annular groove 120 in which is received shift forks 190, 192, 194 and 196, respectively. Shift cylinder assemblies (not shown) provide means by which the shift forks and gears attached thereto may be selectively axially moved one at a time relative to mainshaft 68. Of course, engagement of output gear 158 to mainshaft 68 is effective to couple mainshaft 68 directly to the output shaft 20. The details of a typical prior art blocked, resiliently biased clutch-blocker assembly may be seen by reference to FIGS. 4–7. The yieldable clutch structures are arranged between the axially shiftable mainshaft gears in the auxiliary section and are provided with resilient means purging engagement thereof as set forth in detail in the above mentioned U.S. Pat. Nos. 3,799,002 and 3,983,979. While clutch means utilizing relatively nondeformable blockers of the prior art are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the positive jaw clutch unit positioned between mainshaft gear 154 and the mainshaft 68 in the auxiliary transmission 50. The clutch member or collar 164 is provided with internal splines 198 which are disposed within corresponding external splines 200 provided on the mainshaft 68 for interconnecting the clutch collar 164 to the mainshaft 68 for rotation therewith. However, the cooperating splines 198 and 200 permit the clutch collar 164 to freely slide axially relative to the mainshaft 68. A stop ring 182 is seated within a suitable groove formed on the external periphery of the mainshaft 68 and is disposed for contacting the clutch collar 164 and limiting the rightward axial movement thereof. The clutch collar 164 is normally resiliently urged by a spring 178 into abutting engagement with the stop ring 182. The clutch unit is generally referred to as 202.

The clutch collar 164 is provided with external teeth 204 thereon which are adapted to meshingly engage the internal teeth 206 provided on mainshaft gear 154. The internal clutch teeth 206 forms the other member of clutch unit 202. The teeth 204 on the clutch collar 164 are tapered, as at 208 and in a similar manner the leading edge of internal clutch teeth 206 on the mainshaft gear 154 are similarly tapered at 210. The tapered conical surfaces each extend at an angle of preferably between 30° and 40° relative to the longitudinal access in the mainshaft 68. The exact degree of taper, and the advantages thereof, are explained in detail in above mentioned U.S. Pat. No. 3,265,173. The other end of spring 178 resiliently axes against a further clutch collar 162 (see FIG. 2) which collar is substantially identical to clutch collar 164 but is disposed so that it has tapered leading ends of teeth facing in the opposite direction.

Figure 5:
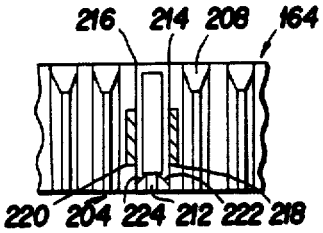
FIG.5 PRIOR ART
FIG. 5 shows the components of the prior art blocker and jaw clutch fragmentarily in synchronous condition permitting shifting.

Referring specifically to FIG. 5, a selected number, here three of the teeth 204 are partially removed for permitting the presence of a blocking ring as hereinafter further described. Such partial removal leaves, however, an axially shortened or partially removed tooth 212 for cooperation with the blocking rings.

Figure 6:
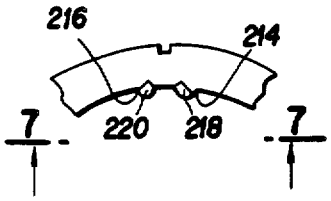
FIG.6 PRIOR ART
FIG. 6 is a fragmentary view of the prior art blocker of FIG. 4.
Figure 7:
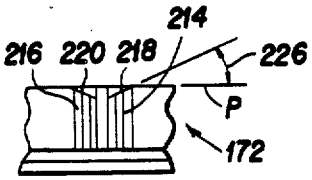
FIG.7 PRIOR ART
FIG. 7 is a view taken in the direction of arrows 7—7 in FIG. 6.

Referring now to the relatively nondeformable blockers, which are illustrated in FIGS. 6 and 7, one thereof is indicated generally at 172, and comprises a ring encircling the clutch member 164 and has an appropriate number, here three pairs, of radially inwardly extending projections 214 and 216, which when properly positioned will mate with the external teeth above mentioned. The inward projections or teeth 214 and 216 are contoured at their sides to lie snugly against the adjacent ones of the teeth 204, are positioned to project into the spaces between a partially removed tooth 212 and the teeth 204 on each side thereof. Each pair of teeth 214 and 216 are circumferentially of less dimension than the corresponding circumferential spaces defined by partially removed teeth 212 and thus blocker ring 172 may be rotated in either a limited clockwise or counterclockwise direction relative to clutch member 164 from the position seen in FIG. 5 in which the space between the teeth 214 and 216 aligns with partially removed tooth 212. Contact of either blocker tooth 214 or 216 by a clutch tooth 204 will limit such relative rotation and cause blocker 172 to rotate with clutch member 164. The space between the inwardly projecting teeth 214 and 216 is, however, of a clearance distance wider than the corresponding circumferential dimension of partially removed tooth 212 so that when properly aligned at synchronism (or more accurately, when the relative speeds of the clutch components cross synchronism) the teeth 214 and 216 will straddle partially removed tooth 212 and the clutch member 164 can move axially through but not past blocker ring 172 to effect engagement with its corresponding gear 154. As may be seen by reference to FIGS. 6 and 7, the end faces of blocker teeth 214 and 216 are tapered as at 218 and 220. The end face of partially removed tooth 212 is also preferably provided with tapers or ramps 222 and 224 complementary with the tapers or ramps 218 and 220 on the blocker ring blocking teeth 214 and 216. The angles 226 of the ramps 218, 220, 222 and 224 is selected such that the blocking teeth and the partially removed teeth will remain in properly blocked position when the main transmission section 48 is engaged, but will tend, under the bias of spring 178 if an auxiliary section shift has been selected, to cause the blocker and clutch to assume a nonblocked position (by causing relative rotational movement of the clutch 164, blocker 172 and/or mainshaft 68) if the main transmission section 48 is disengaged, i.e. in neutral. A ramp angle 226 of about 15°-25°, preferably about 20°, relative to a plane normal to the axis of rotation of mainshaft 68 has proven highly satisfactory for most known semi-blocked transmission structures.

As is described in greater detail by reference to U.S. Pat. Nos. 3,921,469 and 3,924,484, the radially inner side of blocker ring 172 may be provided with an inwardly directed groove 228 which receives an annular resilient ring 230 which is normally of sligtly less diameter than the external diameter of teeth 204 so that when the parts are in an assembled condition, ring 230 is distorted slightly outwardly thereby to exert a light but definite pressure against the external surface of said teeth 204. Inasmuch as the ring 230 fits loosly and only in light frictional contact within the walls of groove 228 this affects a significant resistance to axial movement between the blocker ring 172 and the clutch ring 164 but only an insignificant resistance to relative rotational movement therebetween.

A suitable conical surface 232 extends radially outwardly from the blocker ring 172 and is positioned for engagement with a similar conical surface 234 on a radially inner wall of the gear 154. The axial drag above mentioned is sufficient that the relative driving affect of the surface 232 onto the blocker 172 is much greater than whatever rotative resistance may exist between the blocker 172 and the clutch member 164. A stop ring 236 limits movement of the blocker 172 away from the conical surface 134 when the clutch ring 172 moves out of engagement (leftwardly in FIG. 4).

The operation of the blocker 172 is generally similar to that of known generally nondeformable blockers, and in particular in substantially identical to those nondeformable blockers described in U.S. Pat. No. 3,924,484 and will thus not be described in further detail.

Blocked transmissions, such as auxiliary transmission section 50, have inherently required auxiliary mechanisms and/or operational procedures to achieve satisfactory gear engagement under certain conditions such as rapid upshifting when maximum acceleration of the vehicle is required, upshifting when the vehicle is traveling uphill on a grade and for when the vehicle is to be shifted to neutral into a drive gear when the vehicle is at rest. Blocked transmissions have also inherently required a greater time to achieve a gear shifting operation than is desirable. The above drawbacks have been minimized by the user of the angled ramps 218, 220, 222 and 224 which, when the main transmission section 48 is in a neutral condition, will under the bias of springs 178 or 184 allow a rapid and positive shifting of a selected gear in the auxiliary transmission section 50. If is an important feature of the present invention that the compound transmission 12 utilizes a relatively low inertia mainshaft 68 as compared to many of the prior art compound transmissions. Briefly, the compound transmission 12 may be considered to comprise three separate rotational components, namely as input component, an output component and an intermediate or connecting component. The input component comprises the input or drive gear 58, the main section countershafts 64 and 66, the main section countershaft gears, 72, 74, 76 and 78, and the main section mainshaft gears 80, 82 and 84. The input component is constantly driven by the input shaft 54. The output component comprises the auxiliary mainshaft gears 152, 154 and 156, output gear 158, the auxiliary countershafts 132 and 134 and the auxiliary countershaft countershaft gears 136, 138, 140 and 142. The output component is constantly rotating with output shaft 20. The connecting component comprises mainshaft 68 and the resilient axially movable jaw clutch members 94, 86, 88, 90, 162, 164, 166 and 168 splined thereto.

As the mainshaft 68 is not constantly engaged with any gearing, it is of a relatively low inertia which allows for the above-discussed alignment features of the auxiliary section tapered ramps which the main transmission section 48 is in neutral. By utilizing axially shifted mainshaft gears, in both the main section 48 and the auxiliary section 50, the inertia on the connecting component for mainshaft assembly is further reduced as the shift forks do not exert any rotational drag on any component rotating with the mainshaft 68 in the neutral condition thereof.

It has been found, that in semi-blocked transmission of the type seen in FIGS. 2, 3A, and 3B that a preselected auxiliary section shift, i.e. that is a gear change in the auxiliary section 50 wherein one of the auxiliary section mainshaft gears 152, 154 or 156 or the output gear 158 has been axially moved to and maintained in its axially engaged position relative to mainshaft 68, will be completed as fast as the main transmission section 48 is placed in neutral and then reengaged in the desired gear ratio. The use of spring loaded unblocked jaws in the main transmission section 48 allows engagement of the main transmission sections under conditions wherein the engaging members are not necessarily at exact synchronous speeds and that such engagements will occur satisfactory over a wider range of nonsynchronous conditions than is possible with a conventional nonresiliently engagable positive jaw clutch structure. Our experience has shown that engagement of the main transmission section 48 positive clutch members can occur at nonsynchronous speed differences as great as 800 RPM without perceivable raking of the clutch members. It is noted, of course, that is highly desirable to complete a shift in the main transmission section 48 under conditions of nonsynchronous rotation of less than 800 RPM if possible.

The number of teeth on each of the clutchable ratio gears and countershaft gears is illustrated in FIGS. 3A and 3B by a numeral followed by a capital T. For example, countershaft gear 74 has 24 teeth while clutchable mainshaft gear 80 has 34 teeth. Referring to FIG. 9, the transmission ratio and the engaged gear in each of the main section and auxiliary section are illustrated. Speeds 1–4 may be considered the low range in which main section mainshaft gear 82 is engaged, speeds 5–8 may be considered the intermediate range in which main section mainshaft gear 80 is engaged and speeds 9–12 may be considered the high or direct range in which input gear 58 is engaged thus directly connecting the mainshaft 68 to the input shaft 54. As may be seen, each sequential up or down shift in the forward speeds requires a ratio change in the splitter section while a shift from fourth to fifth speeds and vice versa and a shift from eighth to ninth speeds and vice versa requires a shift of both the main and auxiliary splitter sections. The above shifting sequence is typical of a change gear compound splitter type mechanical transmission.

As mentioned previously, the central processing unit 38 receives inputs such as engine speed and throttle position and based upon a predetermined program generates a shift point profile which determines if the transmission should remain in the currently engaged gear ratio or if an upshift or a downshift is required. If an upshift or downshift is required, the control unit 38 issues command signals to various operators such as the fuel control 26, the clutch operator 30 and the transmission operator 34. If utilized, the control unit 38 will also issue command signals to the engine brake 17. To best utilize the characteristics of the compound splitter type semi-block transmission 12 of the present invention, the control unit 38 issues command signals for a gear change in the following sequence. Having selected an upshift, i.e. a shift to a selected higher speed ratio, the control unit 38 first commands the fuel control 26 to cut off or reduce fuel to engine 14 (regardless of throttle position) and the clutch operator 30 to disengage master clutch 30. The control unit 38 then commands the transmission operator 34 to shift the main section 48 to neutral and to disengage the currently engaged auxiliary section clutch unit 162, 164, 166 or 168 and to preselect the required auxiliary section clutch unit for the proper auxiliary section ratio gear of the selected transmission ratio. Such preselection is accomplished by axially moving the selected auxiliary section ratio gear to its engaged position thus resiliently biasing its associated clutch member to snap into an engaged condition upon the blocker mechanism sensing a substantially synchronous condition between the preselected ratio gear and the clutch. At this time, the control may also issue a command to engine brake 17 to rapidly decelerate the rotational speed of the engine and/or input shaft brake 18 to decelerate the input shaft. Under these conditions, the preselected auxiliary section gear will be quickly and positively engaged by the action of the unblocking ramps 218, 220, 222 and/or 224. The control unit 38 will then manipulate the engine brake 17 and/or fuel control 26 to cause the clutch member 86, 88, 90 or 94 in the main transmission section and the required main section ratio gear 80, 82, 84 or 58 to approach a substantially synchronous speed. Upon a sensing of such an approach of a substantially synchronous speed the correct main section clutchable ratio gear is axially moved to its engaged position resulting in an engagement therewith with a mainshaft, the clutch operator is then commanded to reengage clutch 16 and fuel control 26 resumes applying fuel to the engine in accordance with the operators selected throttle position as determined by throttle pedal 24. The above sequence of operations provides for rapid and automatic shifting of the transmission 12 described above. While the selected auxiliary section clutch assembly will normally complete engagement in the time required to disengage and reengage the main section, a time delay and/or sensor may be provided.

A downshift is accomplished in the same manner except that instead of applying input brake 18 and/or engine brake 17, the master clutch is reengaged and fuel supplied to the engine to increase the speed of the input components of the transmission.

By way of example, assuming an upshift from fifth to sixth speed is required, the control unit 38 will issue a command to fuel control 26 to reduce and/or cut off fuel to engine 14 and to clutch operator 30 to disengage master clutch 16. The control unit 38 will then issue a command to operator 34 to disengage auxiliary mainshaft gear 152 by moving it leftwardly to the position shown in FIG. 2 and to then preselect auxiliary mainshaft gear 154 by moving it leftwardly to its engaged position thereby resiliently biasing clutch collar 164. Main section mainshaft gear 80 is then disengaged by moving it from its engaged position leftwardly to the position shown in FIG.2. Upon disengagement of mainshaft gear 80 the auxiliary mainshaft gear 154 will be engaged by clutch collar 164 acting through the unblocker ramps snapping into engagement therewith. Upon a time delay or sensing of engagement of gear 154, the engine brake 17 and/or input brake 18 may be applied. Main section mainshaft gear 80 will then be moved to its engaged position master clutch 16 reengaged and the fuel control 26 manipulated to bring the rotational speed of engine 14 to its proper rotational value.

The use of an engine brake 17, such as an exhaust brake is highly desirable as the engine 14 may be rapidly decelerated without requiring engagement of master clutch 16 for smoother vehicle operation. By way of example, assuming a transmission having approximately 30% steps or splits between, ratios, at a constant vehicle speed during an upshift, the engine and input shaft speed must be reduced by about 30% to achieve synchro. By using an engine brake, such as exhaust brake 17, or an input shaft brake, the engine may be decelerating at about a 1500 RPM/sec rate (about 600 RPM/sec if no brake) and thus an upshift may be accomplished in about ¼ second.

Clutch operator 30 is controlled by the central processing unit 38 and may engage and disengage master clutch 16 as described in U.S. Pat. No. 4,081,065, hereby incorporated by reference. Transmission 10 may include synchronizing means, such as an acclerator and/or brake mechanism as described in U.S. Pat. No. 3,478,851, hereby incorporated by reference. The transmission 12 preferably, but not necessarily, of the twin countershaft type as seen in U.S. Pat. No. 3,105,395.

Although the present invention has been set forth with a certain degree of particularity, it is understood that various modifications are possible without departing from the spirit and the scope of the invention as hereinafter claimed.

I claim:

1. An automatic mechanical transmission system comprising:

a compound splitter type change gear transmission comprising a multi-speed main transmission section connected in series with a multi-speed auxiliary transmission section, said transmission comprising a housing defining a main and an auxiliary section;

said main transmission section comprising:

an input shaft rotationally supported in said housing and carrying an input gear rotationally fixed thereto, a plurality of spaced and substantially parallel main section countershafts mounted for rotation within said housing, a plurality of main section countershaft ratio gears mounted on each of said main section countershafts, the main section countershaft ratio gears on one main section countershaft being grouped with and radially spaced from identical main section ratio gears on the other main section countershafts for defining main section countershaft gear groups;

means for supply input power to each of said main section countershafts;

a mainshaft disposed between and substantially parallel with said plurality of main section countershafts, said mainshaft extending into said auxiliary section;

a plurality of main section mainshaft ratio gears disposed substantially concentrically of said mainshaft and substantially axially fixed relative thereto, each of said main section mainshaft ratio gears being disposed in continuous driving engagement with a respective one of said main section countershaft gear groups;

releasable nonblocked, nonsynchronized clutch means associated with said main section mainshaft ratio gears for selectively nonrotatably interconnecting same to said mainshaft, said nonblocked, nonsynchronized clutch means including first and second jaw clutch members nonrotatably associated with said main section mainshaft gears and said mainshaft, respectively, said second jaw clutch member being axially slidably mounted on said mainshaft, and main section shift means for selectively axially moving selected ones of said first and second jaw clutch members;

said auxiliary transmission section comprising:

an output shaft rotationally supported in said housing and carrying an output gear splined thereto for rotational movement therewith and axial movement relative thereto, a plurality of spaced and substantially parallel auxiliary section countershafts mounted for rotation within said housing, a plurality of auxiliary section countershafts ratio gears mounted on each of said auxiliary section countershafts, the auxiliary section countershaft ratio gears on one auxiliary section countershaft being grouped with and radially spaced from identical auxiliary section countershaft ratio gears on the other auxiliary section countershafts for defining auxiliary section counterhsaft gear groups, one of said auxiliary section countershaft groups constantly meshed with said output gear, at least one auxiliary section mainshaft ratio gear disposed substantially concentrically of said mainshaft, each of said auxiliary section mainshaft ratio gears being disposed in continuous meshing engagement with a respective one of said auxiliary section countershaft gear groups;

blocked auxiliary section clutch means associated with said auxiliary section mainshaft ratio gears and said output gear for selectively nonrotatably interconnecting same to said mainshaft, said auxiliary section clutch means each including first and second auxiliary section jaw clutch members nonrotatably associated with said auxiliary section mainshaft ratio gear and output gear, and said mainshaft, respectively, said second auxiliary section jaw clutch member being axially slidably mounted on said mainshaft, and resilient means urging said auxiliary section second jaw clutch member in a direction toward said auxiliary section first jaw clutch member, a nondeformable blocker ring carried by said auxiliary section second auxiliary jaw clutch member for rotation therewith with a predetermined relative rotation therebetween, said blocker ring axially movable relative to said auxiliary section second clutch member in at least one axial direction, said blocker ring operable to tend to rotate with said auxiliary section first clutch member at initiation of an auxiliary section clutch engaging operation, said blocker ring and auxiliary section second clutch member each having projections extending therefrom defining an array of interacting projections, said array of interacting projection effective to block relative axial movement of said auxiliary section second clutch member if not aligned, said blocker ring having at least one rotational position relative to said auxiliary section second clutch member wherein said array of projections are aligned and at least one rotational position relative to said auxiliary section second clutch member wherein said array of projections are not aligned, said blocker ring effective to sense nonsynchronous rotation of said auxiliary section clutch members corresponding to blocker ring rotation relative to said auxiliary section second clutch member sufficient to cause a nonalignment of said array of projections to block axial engagement of said auxiliary section clutch members, and stop means coacting between said auxiliary section second jaw clutch member and said mainshaft for limiting the axial movement of auxiliary section second jaw clutch member, said resilient means including spring means resiliently urging said auxiliary section second jaw clutch member against said stop means, said arrays having complementary ramps thereon which, under the bias of said spring when said main transmission section is not engaged, will tend to cause said arrays to align;

auxiliary section shift means for axially shifting said auxiliary section mainshaft ratio gear and said output gear one at a time relative to said mainshaft from first positions wherein one of said auxiliary section mainshaft ratio gear and output gear are spaced from and out of engagement with said auxiliary section second jaw clutch member to a second position wherein one of said auxiliary section mainshaft ratio and output gear contacts said auxiliary section second jaw clutch member and axially displaces same in opposition to the urging of said spring means for creating a resilient clutch engaging force to cause the auxiliary section jaw clutch members to meshingly engage when the speeds thereof are substantially synchronized; and a control assembly for automatically operating said main section and auxiliary section shifting means, said control unit having means to receive input signals, a central processing unit for determining a desired transmission ratio by processing said input signals in accordance with a program and means to generate command output signals to said shifting means, said processing unit commanding changes in transmission ratio in a sequence comprising shifting the main transmission section to neutral during each ratio change, said processing unit commanding shifts of the transmission involving a change in auxiliary section engaged ratio but not a change in main section engaged ratio by a sequence comprising shifting the main transmission section to neutral, completing a shift in the auxiliary section while the main section remains in neutral and thereafter reengaging the main transmission section.

2. The automatic system of claim 1, wherein said sequence commanded by said processing unit includes the additional step of preselecting a shift in the auxiliary section prior to shifting the main transmission section into neutral.

3. The automatic mechanical transmission system of claim 1 wherein said input shaft is driven by a throttle controlled engine through a master clutch, said input signals include at least a signal indicative of throttle position and a signal indicative of engine speed and said output command signals are effective to engage and disengage said master clutch and to control fuel supply to the engine independently of the operator throttle position, said shifting sequence including disengaging said master clutch and cutting off fuel to said engine prior to shifting said main transmission section to neutral and reengaging said master clutch after shifting said main transmission section to engage the required input or mainshaft gear.

4. The automatic transmission system of claim 3 wherein said input signals include signals indicative of input shaft and countershaft speed and said processing unit includes means to determine the relative rotational speeds of the first and second jaw clutch members, said engagement of said main transmission commanded only upon a sensing of substantially synchronous rotation of the first and second jaw clutch members for engaging the required input or mainshaft gear to the mainshaft.

5. The automatic transmission system of claim 4 wherein said system includes an engine brake operated by commands from procesing unit.

6. The automatic transmission system of claim 4 wherein said ramps define an angle of 15°-25° with respect to the plane normal to the axis of said mainshaft.

7. An automatic mechanical transmission system comprising:

a compound splitter type constant mesh change gear transmission comprising a main transmission section and an auxiliary splitter transmission section connected in series thereto, said main transmission section comprising an input shaft having an input gear rotationally fixed thereto, a mainshaft generally coaxial with said input shaft and extending into said auxiliary transmission section and at least one countershaft rotationally supported in said housing and driven by said input gear, a plurality of countershaft gears fixed to said countershaft, a plurality of mainshaft gears surrounding said mainshaft for rotational and axial movement relative thereto and constantly driven by said countershaft gears, and positive nonblocked nonsynchronized resilient jaw clutch means rotationally fixed to said mainshaft for coupling said input gear and mainshaft gears one at a time to said mainshaft, said nonblocked nonsynchronized resilient jaw clutch means each comprising a first annular jaw clutch member fixed to one of said input gear and mainshaft gears and a second jaw clutch member splined to said mainshaft, said second jaw clutch member resiliently biased towards said first jaw clutch member, a stop means fixedly secured to said mainshaft, spring means normally resiliently urging said second jaw clutch member against said stop means when said one of said main shaft gears is in a first axial position and said first and second sets of teeth are disengaged, and main section shifting means for selectively axially moving said input gear and mainshaft gears one at a time relative to said mainshaft;

said auxiliary transmission section comprisng at least one auxiliary countershaft rotationally supported in said housing and an output shaft generally coaxial with said mainshaft, said auxiliary countershaft having a pluraltiy of auxiliary countershaft gears fixed thereto, an output gear splined to said output shaft for rotational movement therewith and axial movement relative thereto, said output gear constantly meshed with one of said auxiliary countershaft gears, at least one auxiliary mainshaft gear surrounding said manshaft for rotational and axial movement relative there to said auxiliary mainshaft gear constantly meshed with another of said auxiliary countershaft gears, blocked resilient jaw clutch assemblies rotationally fixed to mainshaft for selectively coupling said auxiliary mainshaft gear and said output gear, one at a time, to said mainshaft; said blocked resilient jaw clutch assemblies each comprising a first annular jaw clutch member fixed to one of said output gears and auxiliary mainshaft gears and a second jaw clutch member splined to said mainshaft, said second jaw clutch member resiliently biased towards said first jaw clutch member, a stop means fixedly secured to said mainshaft, spring means normally resiliently urging said second jaw clutch member against said stop means when said one gear is in a first axial position and said first and second sets of teeth are disengaged, a substantially nondeformable blocker ring carried by a first of said axially engageable positive clutch members for rotation therewith with a predetermined limited relative rotation therebetween, said blocker ring axially movable relative to said first clutch member in at least one axial direction, said blocker ring operable to tend to rotate with said second clutch member at initiation of a clutch engaging operation, said blocker ring and first clutch member each having projections extending therefrom defining an array of interacting projections, said array of interacting projections effective to block relative axial movement of said first clutch member toward said second clutch member if not aligned, said blocker ring having at least one rotational position relative to said first clutch member wherein said array of projections are aligned and at least one rotational position relative to said first clutch member wherein said array of projections are not aligned, said blocker ring effective to sense nonsynchronous rotation of said clutch members corresponding to blocker ring rotation relative to said first clutch member sufficient to cause a nonalignment of said array of projections to block axial engagement of said clutch members, movement of said one gear axially toward said second jaw clutch member causing said array to contact and move said second jaw clutch member axially away from said stop means in opposition to said spring means, whereby said spring means causes said second jaw clutch member to again move axially in the opposite direction to meshingly engage said first set of teeth when substantial speed synchronization is achieved therebetween, said arrays having complementary ramps thereon which, under the bias of said spring when said main transmission section is not engaged, will tend to cause said arrays to align, and auxiliary shifting means for selectively axially moving said auxiliary mainshaft gear and said output gear relative to said mainshaft; and control assembly for automatically operating said main section and auxiliary section shifting means, said control unit having means to receive input signals, a central processing unit for determining a desired transmission ratio by processing said input signals in accordance with a program and means to generate command output signals to said shifting means said processing unit commanding all nondirectional changes in transmission ratio in the sequence comprising first shifting the main transmission section to neutral, then commanding a shift in the auxiliary transission section to engage the required one of said auxiliary mainshaft gear and output gear and thereafter commanding a shift in the main transmission section to engage the required one of said input gear and mainshaft gear.

8. The automatic mechanical transmission of claim 7 wherein said input shaft is driven by a throttle controlled engine through a master clutch, said input signals include at least a signal indicative of throttle position and a signal indicative to engine speed and said output command signals are effective to engage and disengage said master clutch and to control fuel supply to the engine independently of the operation throttle position, said shifting sequence including disengaging said master clutch and reducing fuel to said engine prior to shifting said main transmission section to neutral.

9. The automatic mechanical transmission system of claim 8 wherein said sequence includes reengaging said master clutch after shifting said main transmission section to engage the required input or mainshaft gear.

10. The transmission system of claim 8, wherein said ramps define an angle of 15°-25° with respect to a plane normal to the axis of said mainshaft.

11. The automatic transmission control system of claim 8 where said transmission includes an input shaft brake for automatically retarding the rotational speed of said input shaft upon disengagement of said master clutch.

12. The automatic transmission of claim 8 wherein said input signals include signals indicative of input shaft and countershaft speed and said processing unit includes means to determine the relative rotational speeds of the nonblocked resilient clutch members, said engagement of said main transmission commanded only upon a sensing of substantially synchronous rotation of the nonblocked clutched members for engaging the required input or mainshaft gear to the mainshaft.

13. The automatic transmission control system of claim 12 wherein said transmission includes an input shaft brake for automatically retarding the rotational speed of said input shaft upon disengagement of said master clutch.

14. The automatic mechanical transmission of claim 12 wherein said system additionally includes an engine brake operated in response to commands from said processing unit.

15. The transmission of claim 12, wherein said ramps define an angle of 15°-25° with respect to a plane normal to the axis of said mainshaft.

*16. An automatic mechanical transmission system comprising:*

*a compound splitter type change gear transmission comprising a multi-speed main transmission section connected in series with a multi-speed auxiliary transmission section, said transmission comprising a housing defining a main and auxiliary section;*

*said main transmission section comprising:*

*an input shaft rotationally supported in said housing and carrying an input gear rotationally fixed thereto, a plurality of spaced and substantially parallel main section countershafts mounted for rotation within said housing, a plurality of main section countershaft ratio gears mounted on each of said main section countershafts, the individual main section countershaft ratio gears on one main section countershaft being grouped with and radially spaced from identical main section ratio gears on the other main section countershafts for defining main section countershaft gear groups;*

*means for supplying input power to each of said main section countershafts;*

*a mainshaft disposed between said substantially parallel with said plurality of main section countershafts, said mainshaft extending into said auxiliary section;*

*a plurality of main section mainshaft ratio gears disposed substantially concentrically of said mainshaft and substantially axially fixed relative thereto, each of said main section mainshaft ratio gears being disposed in continuous driving engagement with a respective one of said main section countershaft gear groups;*

*releasable nonblocked, nonsynchronized clutch means associated with said main section mainshaft ratio gears for selectively nonrotatably interconnecting same to said mainshaft, said nonblocked, nonsynchronized clutch means including first and second jaw clutch members nonrotatably associated with said main section mainshaft gears and said mainshaft, respectively, said second jaw clutch member being axially slidably mounted on said mainshaft, and*

*main section shift means for selectively axially moving selected ones of said first and second jaw clutch members;*

*said auxiliary transmission section comprising:*

*an output shaft rotationally supported in said housing and carrying an outer gear splined thereto for rotational movement therewith and axial movement relative thereto,*

*a plurality of spaced and substantially parallel auxiliary section countershafts mounted for rotation within said housing, a plurality of auxiliary section countershafts ratio gears mounted on each of said auxiliary section countershafts, the individual auxiliary section countershaft ratio gears on one auxiliary section countershaft being grouped with and radially spaced from identical auxiliary section countershaft ratio gears on the other auxiliary section countershafts for defining auxiliary section counter-shaft gear groups, one of said auxiliary section countershaft groups constantly meshed with said output gear,*

*at least one auxiliary section mainshaft ratio gear disposed substantially concentrically of said mainshaft, each of said auxiliary section mainshaft ratio gears being disposed in continuous meshing engagement with a respective one of said auxiliary section countershaft gear groups;*

*blocked auxiliary section clutch means associated with said auxiliary section mainshaft ratio gears and said output gear for selectively nonrotatably interconnecting same to said mainshaft, said auxiliary section clutch means each including first and second auxiliary section jaw clutch members nonrotatably associated with said auxiliary section mainshaft ratio gear and output gear, and said mainshaft, respectively,*

*said second auxiliary section jaw clutch member being axially slidably mounted on said mainshaft, and resilient means urging said auxiliary section second jaw clutch member in a direction toward said auxiliary section first jaw clutch member, a nondeformable blocker ring carried by said auxiliary section second auxiliary jaw clutch member for rotation therewith with a predetermined relative rotation therebetween, said blocker ring axially movable relative to said auxiliary section second clutch member in at least one axial direction, said blocker ring operable to tend to rotate with said auxiliary section first clutch member at initiation of an auxiliary section clutch engaging operation, said blocker ring and auxiliary section second clutch member each having projections extending therefrom defining an array of interacting projections, said array of interacting projections effecitve to block relative axial movement of said auxiliary section second clutch member if not aligned, said blocker ring having at least one rotational position relative to said auxiliary section second clutch member wherein said array of projections are aligned and at least one rotational position relative to said auxiliary section second clutch member wherein said array of projections are not aligned, said blocker ring effective to sense nonsynchronous rotation of said auxiliary section clutch members corresponding to blocker ring rotation relative to said auxiliary section second clutch member sufficient to cause a nonalignment of said array of projections to block axial engagement of said auxiliary section clutch members, and stop means coacting between said auxiliary section second jaw clutch member and said mainshaft for limiting the axial movement of auxiliary section second jaw clutch member, said resilient means including spring means resiliently urging said auxiliary section second jaw clutch member against said stop means, said arrays having complementary ramps thereon which, under the bias of said spring when said main transmission section is not engaged, will tend to cause said arrays to align;*

*auxiliary section shift means for axially shifting said auxiliary section mainshaft ratio gear and said output gear one at a time relative to said mainshaft from said first positions wherein one of said auxiliary section mainshaft ratio gear and output gear are spaced from and out of engagement with said auxiliary section second jaw clutch member to a second position wherein one of said auxiliary section mainshaft ratio and output gear causes contact said auxiliary section second jaw clutch member and axially displaces same in opposition to the urging of said spring means for creating a resilient clutch engaging force to cause the jaw clutch members to meshingly engage when the speeds thereof are substantially synchronized; and*

*a control assembly for automatically operating said main section and auxiliary section shifting means, said control unit having means to receive input signals, a central processing unit for processing said input signals in accordance with a program and means to generate command output signals to said shifting means, said processing unit commanding changes in transmission ratio in the sequence comprising shifting the main transmission section to neutral during each ratio change, said processing unit commanding shifts of the transmission involving a change in auxiliary section engaged ratio but not a change in main section engaged ratio by a sequence comprising shifting the main transmission section to neutral, completing a shift in the auxiliary section while the main section remains in neutral and thereafter reengaging the main transmission section.*

*17. The automatic mechanism transmission system of claim 16 wherein said input shaft is driven by a throttle controlled engine through a master clutch, said input signals include at least a signal indicative of throttle position and a signal indicative of engine speed and said output command signals are effective to engage and disengage said master clutch and to control fuel supply to the engine independently of the operator throttle position, said shifting sequence including disengaging said master clutch and cutting off fuel to said engine prior to shifting said main transmission section to neutral and reengaging said master clutch after shifting said main transmission section to engage the required input or mainshaft gear.*

*18. The automatic transmission system of claim 17 wherein said input signals include signals indicative of input shaft and countershaft speed and said processing unit includes means to determine the relative rotational speeds of the first and second jaw clutch members, said engagement of said main transmission commanded only upon a sensing of substantially synchronous rotation of the first and second jaw clutch members for engaging the required input or mainshaft gear to the mainshaft.*

*19. The automatic transmission system of claim 18 wherein said system includes an engine brake operated by commands from processing unit.*

*20. The automatic transmission system of claim 19 wherein said ramps define an angle of 15°–25° with respect to a plane normal to the axis of said mainshaft.*

* * * * *